4_161
Patented May 13, 1969

3,444,161
ALKYL CYANO ALUMINUM COMPOUNDS AND PROCESS FOR INTRODUCING A CYANO GROUP INTO AN α,β UNSATURATED CARBONYL COMPOUND
Wataru Nagata, Nishinomiya-shi, Japan, assignor to Shionogi & Co., Ltd., Osaka-shi, Japan
No Drawing. Filed Sept. 2, 1965, Ser. No. 484,754
Int. Cl. C07c 121/02, 167/00; C07f 5/06
U.S. Cl. 260—239.55                                   9 Claims

ABSTRACT OF THE DISCLOSURE

A cyano group is introduced into the β-position of a compound having an α,β-unsaturated carbonyl structure, a β-hydroxy-carbonyl structure, a β-amino-carbonyl structure or a β-mercaptocarbonyl structure or their vinylogs, by the action of an alkylcyanoaluminum compound alone—i.e. in absence of any other cyanating agent and more especially in absence of HCN— as hydrocyanation reagent.

---

The present invention relates to a novel hydrocyanation process; more particularly, the invention relates to a novel hydrocyanation process which comprises introducing a cyano group into an α,β-unsaturated carbonyl compound or an equivalent active compound at the carbon atom of the β-position or the equivalent active position thereof by the sole action of an alkylcyano-aluminium compound.

A reaction which introduces a cyano group into an α,β-unsaturated carbonyl compound or an equivalent active compound at the β-position or the equivalent active position thereof by an action of hydrogen cyanide or its salts is already known. And the inventor has already disclosed the fact that an addition of an alkylaluminium compound such as trialkylaluminium will greatly improve the reactivity of the hydrocyanation reagent.

The inventor has now discovered the fact that the reactivity will be much more improved, especially, the reaction velocity will be raised up to several hundreds times and therefore the reaction period will be shortened to only a few minutes at room temperature by the sole utilization of an alkylcyanoaluminium compound as the reagent instead of the combined utilization of hydrogen cyanide and an alkylaluminium compound in such a re-action as mentioned above. The present invention has been completed based on the discovery of that kind.

The object of the present invention is to provide a novel hydrocyanation process. Another object of this invention is to embody rapid hydrocyanation reaction in mild reaction condition in short reaction period. Another object is to embody sole utilization of alkylcyanoaluminium compounds in organic synthesis. The other objects may be apparent from the following disclosure.

The alkylcyanoaluminium compounds which will be employed in the present invention may be represented by the general formula $$RR'AlCN$$

wherein R represents a lower alkyl group such as methyl, ethyl, propyl, butyl and isobutyl group or a lower alkoxy group such as methoxy, ethoxy, propoxy, butoxy and isobutoxy group, R′ represents a group which is same as or different from the above R and falls under the same category as R, or represents a halogen or cyano group, or a group having alkyl groups of a number which is less than the number of valence electron by one and having an atom of an element which belongs to a-sub-group of groups V and VI in the Periodic Table. The preparation of the alkylcyanoaluminium compound can be carried out by reacting the corresponding alkylaluminium compound with equivalent amount of a substance capable of releasing cyano ion such as hydrogen cyanide, its salt and a cyanohydrin, which may be illustrated as $$RR'R''Al + MCN \rightarrow AlRR'CN + R''M$$

wherein R and R′ are the same as above described, R″ represents a group which is the same as or different from the above R or R′ and falls under the same category as R or R′ or a hydrogen atom and M represents an organic radical, a hydrogen atom or a metal.

Although the reaction can be carried out without any solvent since this will proceed rapidly and safely, the utilization of a solvent will be advantageous in a large scale treatment for thermodynamic control. For the solvent of the reactants, any hydrocarbon is suitable for its stability. Either sole utilization of ethers or combined utilization of ethers with the above mentioned hydrocarbons will however be convenient because of their good solubility. Any reaction temperatures ranging above the solidifying point and under the boiling point of the solvent can be employed unless it affects the safety of the treatment. As the produced alkylcyanoaluminium compound usually contains only slight amount of impurity (R″M is a gaseous substance) or contains an impurity which does not affect the utilization thereof (R″M is a metal salt), it can be utilized without any purification. The alkylcyanoaluminium compounds are generally viscous and colorless liquid, gel or solid, and can be purified by distillation.

In carrying out the process of the present invention, the alkylcyanoaluminium compound thus prepared will be mixed with and allowed to react with the starting material in a suitable solvent such as a hydrocarbon or an ether, or a mixture thereof which has been described above. The reaction is very rapid and will be completed in a few minutes without heating in general. However, for the starting materials which have especially great steric hindrance, a longer reaction period about one to several tens minutes or a moderate heating will improve the yield in some instances.

Any aliphatic, cyclic and heterocyclic compounds can be used as raw material for the process so far as they have the α,β-unsaturated carbonyl structure or an equivalent active structure such as β-hydroxy-, β-amino- or β-mercapto-carbonyl structure, or their vinylog. Ketone, aldehyde, carboxylic acid and ester thereof will fall within the class of the above mentioned carbonyl. The molecule of the starting compound may comprise any partial structures so far as they do not affect the subject reaction such as unsaturation, cyclic or acyclic ether, ester, acetal, ketal, acyloxy, lactone, amide, hydroxy, aldehyde and ketone group. Among these, epoxide ring, especially, oxiranes may, however, be hydrocyanated simultaneously in some instances. With an aldehyde group and with a ketone group (not conjugated), an α-cyanohydrin may sometimes be formed. Protection of the functional group may however be omitted because the α-cyanohydrin can be easily hydrolyzed by the action of an acid or an alkali in a succeeding treatment.

For the following specific compounds the present process can be applied:

1-buten-3-one,
1-penten-3-one,
2-penten-4-one,
2-methyl-1-buten-3-one,
2-methyl-1-penten-3-one,
3-methyl-2-penten-4-one,
2-methyl-2-penten-4-one,
3-hepten-2-one,
2-methyl-2-hexen-3-one,
3-ethyl-3-hepten-5-one,
5-ethyl-4-hepten-3-one, 7-methyl-5-octen-4-one,
2,4,5-trimethyl-4-hexen-3-one,
2-methylcyclopent-2-en-1-one,
2-cyclohexen-1-one,
2-propylidenecyclopentanone,
1-acetylcyclohexene,
2-cyclohexylidenecyclohexanone,
3-phenyl-1-propen-3-one,
benzalacetone,
isopropylideneacetophenone,
1-naphthylideneacetone,
furfurylideneacetone,
furfurylideneacetophenone,
acrolein,
2-methyl-2-propenal,
2-pentenal,
crotonaldehyde,
cyclopentene-1-carboxaldehyde,
cyclohexene-1-carboxaldehyde,
2-ethyl-2-hexenal,
cinnamaldehyde,
3-furoyl-acrolein,
acrylic acid,
isocrotonic acid,
methacrylic acid,
2-pentenoic acid,
tiglic acid,
angelic acid,
sorbic acid,
2-octenoic acid,
cyclopentene-1-carboxylic acid,
cyclohexene-1-carboxylic acid,
cyclohexylideneacetic acid,
3-cyclohexylacrylic acid,
cyclopentene-1-malonic acid,
cinnamic acid,
p-methyl-cinnamic acid,
o-carboxycinnamic acid,
α-naphthylacrylic acid,
3-(1-phenanthryl)-acrylic acid,
2-furylacrylic acid,
2-thienylacrylic acid,
3-pyridylacrylic acid,
2-thienylacrylic acid,
isopropylidenemalonic acid,
2-chloroacrylic acid,
2-bromoacrylic acid,
p-chlorocinnamic acid,
and their esters.

The end product which will be formed by the process according to the present invention is a compound resulting from the introduction of a cyano group into the corresponding starting material at the β-position or an equivalent active position, for instance, δ-position in a vinylog, and from the simultaneous introduction of another cyano group into the said starting material to form α-cyanohydroin, which can be selectively and easily decomposed by treatment with a proton donating agent such as water, aqueous acid or basic solution, alcohols, etc.

EXAMPLE 1

Into a solution of 15.67 g. of triethylaluminium in 40 ml. of benzene, there is added a solution of 3.696 g. of hydrogen cyanide in 35 ml. of benzene dropwisely at 10–15° C.; during the addition ethane generation occurs. The mixture is allowed to stand at room temperature for 30 minutes, whereby ethane generation ceases. Total volume of generated ethane gas is 3.22 liters; 95% of theoretical yield. The reaction mixture is distilled in nitrogen atmosphere under reduced pressure to remove the solvent, whereby 15.2 g. (100% yield) of crude diethylaluminium cyanide is obtained as residue.

IR: $\nu_{max}^{film}$ 2920, 2890, 2860 (CH stretching) 2211 (CN); 1467, 1456 (CH bending); 1408, 1377 ($CH_3$); 1225, 1192, 1092, 1045, 984, 949, 918, 892, 866, 802 cm.$^{-1}$. N.M.R. (in 8% benzene solution): 9.92 (quartet: Al—$CH_2$—$CH_3$), 8.80 (triplet: Al—$CH_2$—$CH_3$): J=8 cps.

Molecular weight, calcd. as monomer: 111. Found, by ebullioscopic determination: 580, 710. Ethane (identified by gas chromatography) evolution in decomposition by the action of aqueous dilute sodium hydroxide solution: 101% of theoretical amount calcd. from the formula $Al(C_2H_5)_2CN$. CN ion (produced in decomposition by the action of aqueous dilute sodium hydroxide solution) determination by titration with silver nitrate: 94% of theoretical amount calcd. from the same formula. Aluminium content, calcd.: 24.29%. Found, by chelate titration of dilute hydrochloric acid decomposition: 23.2%.

By distillation under reduced pressure, the product is almost completely distilled off at the boiling point near about 150° C. under 0.07 mm. Hg pressure, on a oil bath heated to 200° C. The resultant pure product has the nearly same physical and chemical characteristics such as IR-spectrum, N.M.R.-spectrum, etc. Yield: 14.07 g. (92% of theoretical).

EXAMPLE 2

Into a solution of 11.31 g. of triethylaluminium in 40 ml. of tetrahydrofuran, a solution of 2.583 g. of hydrogen cyanide in 30 ml. of tetrahydrofuran is gradually dropped at room temperature, whereby 1 molar equivalent amount of gas is generated. The reaction mixture is distilled under reduced pressure in nitrogen stream to remove solvent and the residue is purified by distillation under reduced pressure, whereby the same product as in the above Example 1, diethylaluminium cyanide (5.89 g., 53% yield) is obtained.

EXAMPLE 3

Into a solution of 10.66 g. of triethylaluminium in 100 ml. of ether, a solution of 2.69 g. of hydrogen cyanide in 45 ml. of tetrahydrofuran is added dropwisely with stirring under external ice-cooling within 40 minutes. The reaction mixture is allowed to stand over night and thereafter treated in the same manner as in the above Example 1, whereby 7.473 g. (yield: 77%) of pure diethylaluminium cyanide is obtained.

EXAMPLE 4

Into a solution of 5.32 g. of diethylaluminium hydride in 15 ml. of benzene, a solution of 1.662 g. of hydrogen cyanide in 20 ml. of benzene is added dropwisely at 10° C., whereby evolution of hydrogen gas is observed. The reaction mixture is, after completion of the addition, kept at room temperature for a while, and then fractionally distilled under reduced pressure in nitrogen stream to afford 6.20 g. (yield: 90% of theoretical value) of pure diethylaluminium cyanide.

EXAMPLE 5

Into a solution of 9.78 g. of trimethylaluminium in 40 ml. of benzene, a solution of 3.92 g. of hydrogen cyanide in benzene is added dropwisely within 1 hour with stirring and external ice-cooling, whereby vigorous reaction occurs and simultaneously methane gas is generated. The amount of the gas at the end of addition is nearly equal to 100% of theoretical value. The reaction mixture in which significant amount of the product dimethylaluminium cyanide is crystallized out is admixed with 150 ml. of hexane to make homogeneous solution, which is treated thereafter in the same manner as in the above examples to afford viscous oily product (distilled off at 150–160° C., bath temperature, at 0.25 mm. Hg pressure). The product, 8.278 g. (yield: 73.5%), immediately solidifies to white crystals of M.P. 85–86° C.

According to the determination methods described in the Example 1, the following data are obtainable.

*Analysis.*—Calcd. for Al(CH₃)₂CN: Al, 32.47%; CN, 31.34%; CH₃, 36.20%. Found: Al, 31.0%; CN, 31.3%; CH₃, 34.7%.

EXAMPLE 6

To a solution of 21.78 g. of triisobutylaluminium in 100 ml. of benzene, a solution of 3.11 g. of hydrogen cyanide in benzene is added dropwisely with stirring under external ice-cooling. The reaction mixture is, after standing over night, distilled to remove solvent and produced isobutane. The residue is distilled under reduced pressure to obtain highly viscous syrupy substance, B.P. (bath temperature) 245–290° C. at 0.09 mm. Hg pressure.

IR: $\nu_{max}^{film}$ 2930, 2860 (CH stretching) 2215 (CN); 1465 (CH bending); 1403, 1381, 1366 (CH₃); 1323, 1183, 1159, 1069, 1014, 945, 818 cm.⁻¹.

*Analysis.*—Calcd. for Al(i-C₄H₉)₂CN: Al, 16.13%; CN, 15.56%. Found: Al, 15.95%; CN, 15.00%.

EXAMPLE 7

To a solution of 7.5 g. of diethylaluminium chloride in 50 ml. of hexane, there is added a solution of 1.73 g. of hydrogen cyanide in benzene dropwisely under stirring and external cooling with ice, whereby white crystals are separated out. After the crystallization is completed by standing at room temperature, the crystals are collected and washed with hexane in nitrogen atmosphere. Yield of thus obtained product, ethylcyanoaluminium chloride, M.P. 130 – 132° C. is 4.79 g. (64.4%).

*Analysis.*—Calcd. for Al(C₂H₅)CN·Cl: Al, 22.95%; C₂H₅, 24.73%; CN, 22.14%; Cl, 30.17%. Found: Al, 22.1%; C₂H₅, 24.7%; CN, 22.1%; Cl, 29.5%.

EXAMPLE 8

Two reactions are carried out with 0.0018 molar solution of 4-cholesten-3-one in benzene (× 1000 dilution). The one with 6 equivalent moles of diethylaluminium cyanide requires only 1 minute whereas the other with the same moles equivalent of hydrogen cyanide-triethylaluminium mixture requires two hundred minutes for the half-values.

EXAMPLE 9

To a solution of 1.6 g. of diethylaluminium cyanide in 20 ml. of benzene, there is added a solution of 2.0 g. of 4-cholesten-3-one in 15 ml. of tetrahydrofuran and the resulting mixture is stirred for a while (2–3 minutes). The mixture is added with methanol to decompose the excess amount of reagent and then added with aqueous 2 N sodium hydroxide solution under cooling with ice. The organic layer is collected and the aqueous layer is extracted with ether. The both organic layers are combined together, washed with water, dilute hydrochloric acid and water in order, dried and then evaporated under reduced pressure. The evaporation residue (2.35 g.) is chromatographed over 40 g. of alumina. Fractional recrystallization of eluates from petroleum ether-benzene (4:1–0:1) with ethanol affords 829 mg. (yield: 38.8%) of 3-oxo-5β-cholestane-5-carbonitrile, M.P. 117–121° C. and 1.119 g. (yield: 52.3%) of 3-oxo-5α-cholestane-5-carbonitrile, M.P. 174–178° C. Total yield: 1.948 g. (91.1% of theoretical value).

The quite equal results are obtainable by application of diisobutylaluminium cyanide, dimethylaluminium cyanide or ethylcyanoaluminium chloride in tetrahydrofuran or hexanebenzene mixture instead of diethylaluminium cyanide.

EXAMPLE 10

According to the similar procedure as in the Example 9, the following results are obtained (reaction period: about ten minutes to 1 hour).

(±)-2,3,4,4a,5,6,7,8-octahydronaphthalen-2-one affords (±) - 2 - oxo-trans-decahydronaphthalene-8a-carbonitrile (M.P. 55–57° C.) and (±)-2-oxo-cis-decahydronaphthalene-8a-carbonitrile (semicarbazone: M.P. 204–206° C.) in ratio 1:20. Total yield: 78% of theoretical value.

(±)- 7α-acetyloxy-(4aβ,4bα,8aβ)-2,3,4,4a,4b,5,6,7,8,8a, 9,10-dodecahydrophenanthren-2-one affords (±)-7α-acetyloxy-2-oxo -(4aβ,4bα,8aβ)-tetradecahydrophenanthrene-10aα-carbonitrile (M.P. 148–150° C.) and (±)-7α-acetyloxy-2-oxo - (4aβ,4bα,8aβ) - tetradecahydrophenanthrene-10aβ-carbonitrile (ethylene ketal: M.P. 196–201° C.) in ratio 1:8. Total yield: 78%.

19-nortestosterone acetate affords 17β-acetyloxy-3-oxo-5α-estrane-5-carbonitrile (M.P. 207–211° C.) and 17β-acetyloxy-3-oxo-5β-estrane-5-carbonitrile (M.P. 210–212° C.) in ratio 1:8 and in yield 83%.

(±)-3β-acetyloxy-D-homo-18-nor-5α-androst-13(17a)-en-17-one affords (±)-3β-acetyloxy-17-oxo-D-homo-5α-androstane-18-nitrile (M.P. 223–225° C.) and (±)-3β-acetyloxy - 17 - oxo - D-homo-5α,13α-androstane-18-nitrile (M.P. 227–233° C) in ratio 1:18 and in yield 83%.

Androsta-4,9(11)-diene-3,17-dione affords 3,17-dioxo-5α- and -5β-androst-9(11)-ene-5-carbonitrile in ratio 1:7. Total yield: 83%.

(±) - 3-methoxy-18,19-bisnorpregna-1,3,5(10),13(17)-tetraen-20-one affords (±)-3-methoxy-20-oxo-19-norpregna-1,3,5(10)-triene-18-nitrile and (±)-3-methoxy-20-oxo-19-nor-13ξ,17ξ-pregna-1,3,5(10)-triene-18-nitrile in ratio 1:10. Total yield: 85%.

7-oxocholesterol acetate affords 3β-acetyloxy-7-oxo-5α-cholestane-5-carbonitrile. Yield: 90%.

3β-acetyloxy-8,22-ergostadien-11-one affords 3β-acetyloxy-11-oxo-5α-ergost-22-ene-8-carbonitrile. Yield: 75%.

1- methyl-1,2,3,4,4a,4b,5,6,7,9,10,10a-dodecahydro-1,4a-methanoiminomethanophenanthren-7-one N-methanesulfonate affords 1-methyl-8aβ-cyanoperhydro-1,4a-methanoiminomethanophenanthren - 7 - one N - methanesulfonate (M.P. 223–225° C.) and 1-methyl-8aα-cyanoperhydro-1,-4a-methanoiminomethanophenanthren-7-one N-methanesulfonate (M.P. 204–210° C.) in ratio 1:50. Total yield: 60%.

EXAMPLE 11

According to the similar procedure as in the Example 9, the similar results are obtained (reaction period: about ten minutes to 1 hour).

(±)-3α - acetyloxy-D-homo-18-nor-5β-androsta-9(11),-13(17a)-dien-17-one affords (±)-3α-acetyloxy-17-oxo-D-homo - 5β-androst - 9(11) - ene - 18 - nitrile (M.P. 249–251° C.).

3,3-ethylenedioxy-17α-hydroxy-D-homo-18-norandrosta-5,12-dien-11-one affords 3,3-ethylenedioxy-17α-hydroxy-11 - oxo-D-homoandrost - 5 - ene-18-nitrile (M.P. 237–239° C.).

3,3;17,17-bisethylenedioxyandrost-5,8-dien-11 - one affords 3,3;17,17-bisethylenedioxy-8β-cyanoandrost-5-en-11-one (M.P. 199.5–200.5° C.).

17,20;20,21-bismethylenedioxy-3,3-ethylenedioxypregna-5,8-dien-11-one affords 17,20;20,21-bismethylenedioxy-3,-3 - ethylenedioxy-8-cyanopregn-5-en-11-one (M.P. 220–223° C.).

(±)-1-oxo-7-methoxy - 1,2,3,4,9,10 - hexahydrophenanthrene affords (±)-1 - oxo-7-methoxy-1,2,3,4,4aα,9,10, 10aβ - octahydrophenanthrene-4a-carbonitrile (M.P. 150 152° C.) and (±)-1-oxo-7-methoxy-1,2,3,4,4aβ,9,10,-10aβ-octahydrophenanthrene-4a-carbonitrile (M.P. 128–130° C.).

1,1,4aβ-trimethyl - 1,2,3,4,4aβ,4bα,5,6,7,9,10,10aα - dodecahydrophenanthren-7-one affords 1,1,4aβ-trimethyl-7-oxo-4aβ,4bα,8aβ, 10aα - perhydrophenanthren-8aβ-nitrile (M.P. 144–144.5° C.).

3β-acetyloxypregna-5,16-diene-20-one affords 3β-acetyloxy-20-oxopregn-5-ene-16α - carbonitrile (M.P. 190–194° C.).

1- methyl - 1,2,3,4,4a,4b,5,6,7,9,10,10a-dodecahydro-1, 4a - methanoiminomethanophenanthren-7-one N-acetate affords 1-methyl-8aβ-cyanoperhydro-1, 4a-methanoiminomethanophenanthren-7-one N-acetate (M.P. 198–200° C.).

3 - methoxy-gona-1,3,5(10),13(17)-tetraen-16-one affords 3 - methoxy-16-oxo-13α-estra-1,3,5(10)-triene-18-nitrile (M.P. 141–143° C.) and 3-methoxy-16-oxoestra-1,3,5(10)-triene-18-nitrile (M.P. 218–223° C.).

3β-hydroxy-18-nor-5α-pregn-13(17)-en-20-one affords 3β-hydroxy-20-oxo-5α-pregnane-18-nitrile (M.P. 168–169° C.) and 3β - hydroxy-20-oxo-5α,13α-pregnane-18-nitrile (M.P. 162–163° C.).

Testosterone propionate affords 5α-cyano-17β-propionyloxyandrostan-3-one (M.P. 166–167.5° C.) and 5β-cyano - 17β-propionyl - oxyandrostan-3-one (M.P. 138–140° C.).

Androst-4-ene-3,17-dione affords 3,17-dioxo-5α-androstane-5-carbonitrile (M.P. 220–223° C.) and 3,17-dioxo-5β-androstane-5-carbonitrile (M.P. 227–232° C.).

Pregn-4-ene-3,20-dione affords 3,20-dioxo-5α-pregnane-5-carbonitrile (M.P. 227–232° C.) and 3,20-dioxo-5β-pregnane-5-carbonitrile (M.P. 201–207° C.).

EXAMPLE 12

According to the similar procedure as described in the Example 9, the following conversions are performed in quantitiative yield for reaction period not longer than 10 minutes: 3-benzoyl-propionitrile (M.P. 75° C.) from phenyl vinyl ketone, 3-benzoyl-2-phenylpropionitrile (M.P. 125° C.) from 1,3-diphenyl-1-propen-3-one, 3-(2-furoyl)-propionitrile (M.P. 75° C.) from 2-furyl vinyl ketone, 3-(2-thenoyl)-propionitrile (M.P. 66° C.) from thienyl vinyl ketone, methyl 3-cyanopropionate (B.P.$_{10}$ 95–100° C.) from methyl acrylate, ethyl 3-cyanopropi (B.P.$_{10}$ 101–105° C.) from ethyl acrylate, ethyl 3-cyano-3-phenylpropionate (B.P.$_{10}$ 165–171° C.) from ethyl cinnamate, and diethyl 2-cyano-butane-1,1-dicarboxylate (B.P.$_{2-3}$ 127–133° C.) from diethyl 1-butene-1,1-dicarboxylate.

What I claim is:

1. In a hydrocyanation process for introducing a cyano group into the β-position of a member selected from the group consisting of α,β-unsaturated carbonyl compounds, β-hydroxy-carbonyl compounds, β-amino-carbonyl compounds and β-mercapto-carbonyl compounds and vinylogs thereof by the action thereon of hydrocyanation agent, the improvement according to which the hydrocyanation agent is preformed alkylcyanoaluminum compound selected from the group consisting of di(lower) alkylaluminum cyanide and lower alkylcyanoaluminum chloride, said improvement comprising intermixing the starting compound with, as the sole hydrocyanation reagent, said alkylcyanoaluminum compound, and recovering the resultant β-cyano compound.

2. The improvement according to claim 1, wherein the starting carbonyl compound is a member selected from the group consisting of ketones, aldehydes, carboxylic acids and carboxylic acid esters.

3. The improvement according to claim 1, wherein the intermixing is carried out in a substantially anhydrous medium at a temperature from room temperature to boiling point of the reaction medium for a reaction period not longer than one hour.

4. The improvement according to claim 1, and treating the resultant product with a member selected from the group consisting of aqueous acidic or alkaline solutions.

5. The improvement according to claim 1, wherein the said α,β-unsaturated carbonyl compound is a hydropolycyclic compound which contains a hetero atom in the ring system.

6. The improvement according to claim 1 wherein the starting material is a compound selected from the group consisting of 4-cholesten-3-one, (±)-2,3,4,4a,5,6,7,8 - octahydronaphthalen-2-one, (±)-7α - acetyloxy-(4aβ, 4bα,8aβ)-2,3,4,4a,4b,5,6,7,8,8a,9,10 - dodecahydrophenanthren-2-one, 19-nortestosterone acetate, (±)-3β-acetyloxy-D-homo-18-nor-5α-androst-13(17a)-en-17-one, androsta-4,9(11) - diene-3,17-dione, (±)3-methoxy-18,19-bisnorpregna - 1,3,5(10),13(17)-tetraen-20-one,7-oxocholesterol acetate, 3β-acetyloxy-8,22-ergostadien-11-one 1-methyl-1, 2,3,4,4a,4b,5,6,7,9,10,10a - dodecahydro-1,4a-methanoiminomethanophenanthren-7-one N-methanesulfonate, (±)-3α - acetyloxy - D-homo-18-nor-5β - androsta-9,(11),13 (17a) - dien-17-one, 3,3-ethylenedioxy-17α - hydroxy-D-homo-18-norandrosta - 5,12-dien-11-one, 3,3;17,17-bis-ethylenedioxyandrost - 5,8 - dien-11-one, 17,20;20,21-bis-methylenedioxy - 3,3 - ethylenedioxypregna-5,8-dien-11-one, (±) - 1-oxo-7-methoxy-1,2,3,4,9,10-hexahydrophenanthrene, 1,1,4aβ-trimethyl-1,2,3,4,4aβ, 4bα, 5,6,7,9,10, 10aα-dodecahydrophenanthrene-7-one, 3β-acetyloxypregna - 5,16-diene-20-one, 1 - methyl-1,2,3,4,4a,4b,5,6,7,9,10, 10a - dodecahydro - 1,4-a - methanoiminomethanophenanthrene-7-one N-acetate, 3-methoxy-gona,1,3,5(10),13(17)-tetraen-16-one, 3β-hydroxy-18-nor - 5α - pregn-13(17)-en 20-one, testosterone propionate, androst-4-ene-3,17-dione and pregn-4-ene-3,20-dione.

7. A pre-formed alkylcyanoaluminum compound of the formula

RR'AlCN wherein R is lower alkyl or lower alkoxy and R' is lower alkyl, lower alkoxy, halogen or cyano.

8. A pre-formed alkylcyanoaluminum compound according to claim 7, wherein R and R' each is lower alkyl.

9. A pre-formed alkylcyanoaluminum compound according to claim 1, wherein R and R' each is ethyl.

References Cited

UNITED STATES PATENTS 3,231,566   1/1966   Nagata _____ 260—239.55
3,143,542   8/1964   Ziegler et al. _____ 260—239

OTHER REFERENCES

Nagata et al., Tetrahedron Letters (1966), vol. 18, pp. 1913–18.

Nagata et al., Tetrahedron Letters (1966), vol. 8, pp. 847–52.

ELBERT L. ROBERTS, Primary Examiner.

U.S. Cl. X.R.

260—340.9, 397.2, 397.3, 397.4, 448, 464, 465, 465.4